United States Patent [19]

Noro

[11] Patent Number: 5,397,870

[45] Date of Patent: Mar. 14, 1995

[54] LEVER OPERATING DEVICE FOR A SWITCH

[75] Inventor: Yoshimi Noro, Aichi, Japan

[73] Assignee: Kabushiki Kaisha Tokai Rika Denki Seisakusho, Aichi, Japan

[21] Appl. No.: 191,145

[22] Filed: Feb. 3, 1994

Related U.S. Application Data

[63] Continuation of Ser. No. 969,321, Oct. 30, 1992, abandoned.

[30] Foreign Application Priority Data

Nov. 20, 1991 [JP] Japan ................. 3-103301 U

[51] Int. Cl.6 ................................................ H01H 3/04
[52] U.S. Cl. ............................. 200/335; 200/556; 200/561
[58] Field of Search .............. 200/339, 335, 561, 556, 200/553

[56] References Cited

U.S. PATENT DOCUMENTS

| 3,187,120 | 6/1965 | Akst | 200/561 |
| 4,563,551 | 1/1986 | Black, III et al. | |
| 5,051,550 | 9/1991 | Harris | 200/339 X |

FOREIGN PATENT DOCUMENTS

| 939760 | 2/1956 | Germany. | |
| 1807067 | 3/1960 | Germany. | |
| 2402613 | 7/1975 | Germany | 200/339 |
| 2427587 | 12/1975 | Germany. | |
| 3905543 | 4/1990 | Germany | 200/335 |

Primary Examiner—Renee S. Luebke
Attorney, Agent, or Firm—Finnegan, Henderson, Farabow, Garrett & Dunner

[57] ABSTRACT

An object of this invention is to provide a lever operating device for a switch in which the distance between a lever and an actuating element is reduced. According to the present invention, a lever is swung, a transmission member is swung, so that an actuating element is moved to operate a switch. In this connection, arms of the transmission member are made equal in length to each other, so that, as the lever swings, an engaging pin swings the same distance as the actuating element moves. Hence, by setting the distance between the shaft pin and the engaging pin of the lever to the movement distance of the actuating element, the latter can be moved a predetermined distance required for operating the switch, even when the arm of the transmission member is short.

5 Claims, 2 Drawing Sheets

LEVER OPERATING DEVICE FOR A SWITCH

This application is a continuation, of application Ser. No. 07/969,321, filed Oct. 30, 1992, now abandoned.

BACKGROUND OF THE INVENTION

This invention relates to a lever operating device for a switch in which a lever is swung to operate the switch.

An example of a conventional lever operating device of this type is a lever operating device for a dimmer switch which is used to switch the high beam and the low beam of a headlight on a motor vehicle. An example of the conventional lever operating device for a dimmer switch is as shown in FIG. 4.

As shown in FIG. 4, a lever 1 is swingably mounted on a base body (not shown) through a shaft pin 2. An actuating element 3 is provided on the base body in such a manner that it is located below the lever 1 and is linearly movable to the right and to the left. An arm 4 is extended downwardly from the swing fulcrum of the lever 1. The end portion of the arm 4 is engaged with a recess 3a formed in the actuating element 3.

When the lever 1 is swung from a low beam position L indicated by the solid lines to a high beam position H indicated by the two-dot chain lines; that is, when it is swung in the direction of the arrow A, the actuating element 3 is moved in the direction of the arrow C. On the other hand, when it is swung from the high beam position H to the low beam position L; i.e., when it is swung in the direction of the arrow B, the actuating element 3 is moved in the direction of the arrow D. As the actuating element 3 is moved in this manner, the dimmer switch is operated, so that the low beam of the headlight is switched over to the high beam, or vice versa.

In order to operate the dimmer switch, the actuating element 3 should move a certain distance S. The movement distance S of the actuating element 3 depends on the swing displacement R of the end portion of the arm 4, and the former S is substantially equal to the latter R.

On the other hand, for the operability of the lever, it is not practical to set the swing angle $\alpha$ between the high beam position H and the low beam position L to a large value. Hence, in order to move the activating body 3 the predetermined distance S by swinging the lever 1 through a small swing angle $\alpha$, it is necessary that the arm 4 is large in length E. This means that the lever 1 should be spaced greatly away from the actuating element 3. Therefore, the resultant dimmer switch is large in vertical thickness as a whole; that is, it is unavoidably large in size.

SUMMARY OF THE INVENTION

In view of the foregoing, an object of this invention is to provide a lever operating device for a switch which allows reduction of the size of the resultant switch.

The foregoing object of the invention has been achieved by the provision of a lever operating device for a switch in which, according to the invention, a lever is swingably supported on a base body, an actuating element for operating the switch is movably provided on the base body, displacement transmitting means is provided on the lever at a predetermined distance from the swing fulcrum of the lever, a transmission member is swingably supported on the base body which includes a driving arm engaged with the displacement transmitting means and a driven arm engaged with the actuating element, and the swing fulcrum of the transmission member is located between the swing fulcrum of the lever and the displacement transmitting means.

For instance when, in the device of the invention, the driving arm and the driven arm are equal in length to each other, the actuating member is moved the same distance as the displacement transmitting means swings.

Therefore, by making the distance between the swing fulcrum of the lever and the displacement transmitting means equal to the length of the arm of the conventional lever operating device, the movement distance of the actuating member can be equal to that of the conventional one even when the length of the arm of the transmission member is decreased.

DETAILED DESCRIPTION OF THE PREFERRED EMBODIMENTS

A lever operating device for a dimmer switch on a motor vehicle, which constitutes one embodiment of this invention, will be described with reference to FIGS. 1 and 2.

Figure 1:
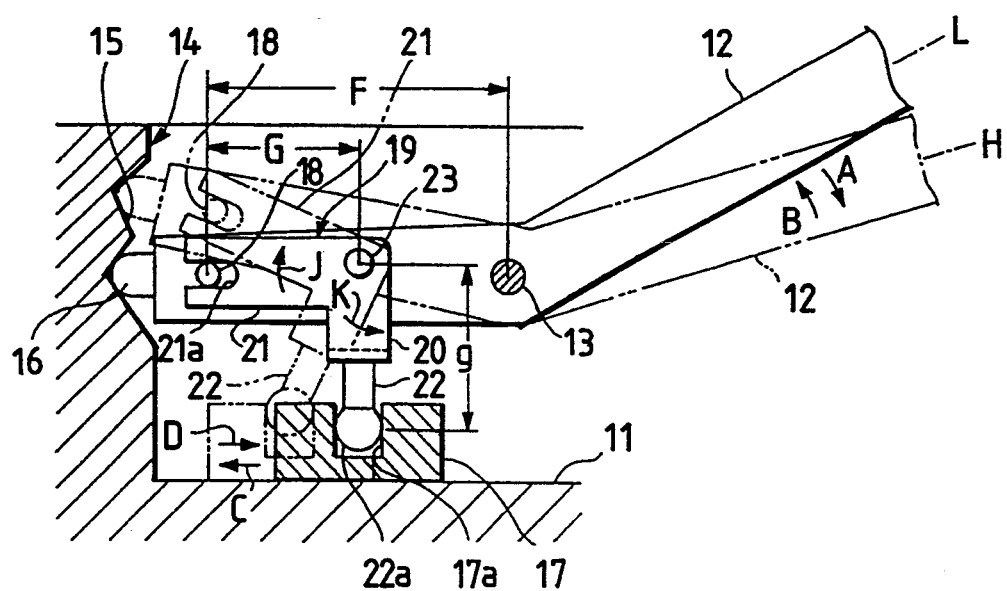
FIG. 1 is a side view outlining a lever operating device for a switch, which constitutes one embodiment of this invention.

As shown in FIG. 1, a base body 11 is arranged near the steering wheel (not shown) of a motor vehicle, and a lever 12 is supported through a shaft pin 13 on the base body in such a manner that it is swingable about the shaft pin 13 in a vertical plane. More specifically, the lever is swung between a low beam position L indicated by the solid lines in FIG. 1 and a high beam position H indicated by the two-dot chain lines, and it is held at any one of the operation positions L and H by a stepping mechanism 14.

The stepping mechanism 14 is a conventional one comprising a saw-tooth-shaped stepping wall 15 formed in the base body 11, and a slider 16 provided on one end portion of the lever 12, the other end portion of which is an operating end portion. The slider 16 is held pushed against the stepping wall by a spring (not shown) at all times.

Furthermore, an actuating element 17 is provided on the base body 11 in such a manner that it is located below the lever 12 and is movable to the right and to the left. As the actuating element 17 is moved to the right and to the left, the dimmer switch (not shown) is operated, to switch the low beam and the high beam of the head light.

Figure 4:
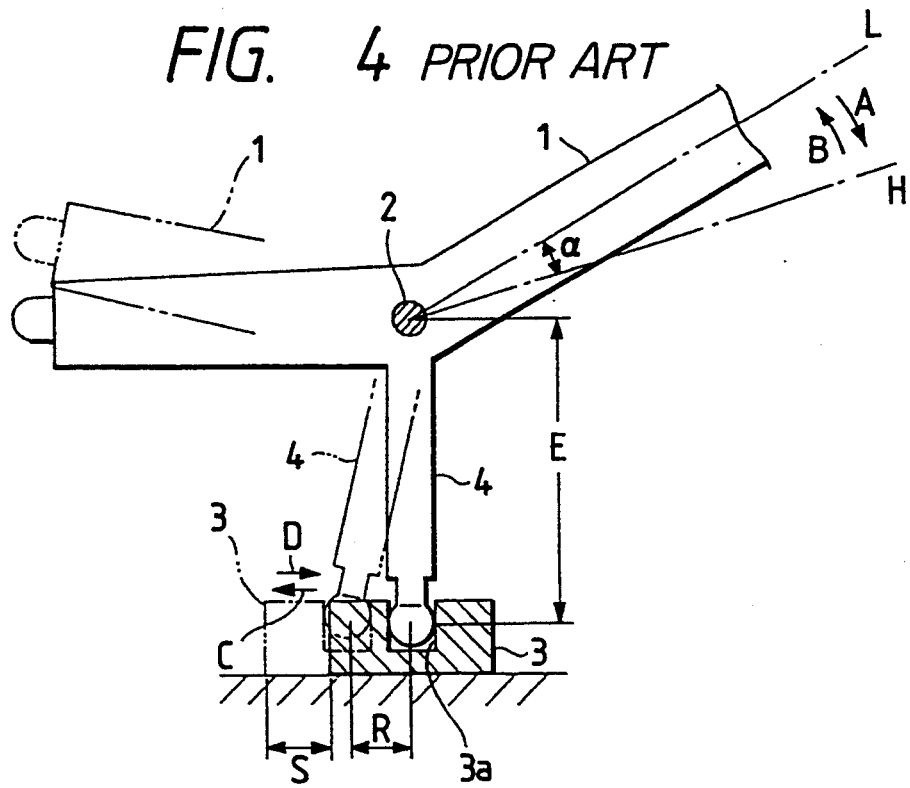
FIG. 4 is a side view, corresponding to FIG. 1, showing a conventional lever operating device for a switch.

The actuating element 17 is so designed that it moves as the lever 12 swings. For this purpose, displacement transmitting members, namely, an engaging pin 18 is fixedly secured to the lever 12 in such a manner that it penetrates the end portion of the lever 12 on the side of the stepping mechanism 14. In the embodiment, the distance F between the shaft pin 13 and the engaging pin 18 is equal to the length E of the arm 4 in the conventional lever operating device shown in FIG. 4. In addition, a transmission member 19 is swingably mounted on the base body 11. The transmission member 19 is to transmit the swing displacement of the engaging pin 18 to the actuating element 17.

Figure 2:
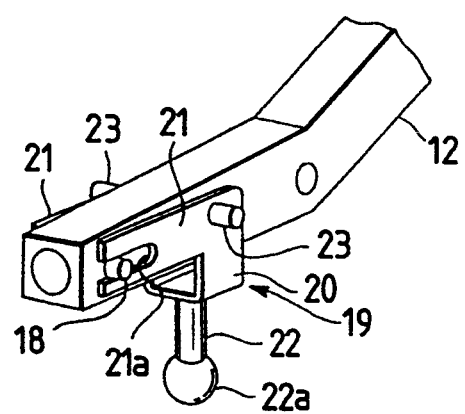
FIG. 2 is a perspective view of a part of the device shown in FIG. 1.

The transmission member 19 is made up of a pair of drive arms 21 extended from the upper end portions of a U-shaped coupling part 20 to the left in FIG. 2, and a driven arm 22 extended downwardly from the bottom of the coupling part 20. Therefore, the drive arms 21 form 90° with the driven arm 22. A pair of shafts 23 are extended outwardly from the upper end portions of the coupling part 20.

The transmission member 19 is supported through the shafts 23 on the base body 11. In the embodiment, the shafts 23 are supported by the base body 11 in such a manner that they are located near the straight line connecting the shaft pin 13 and the engaging pin 18 of the lever 12 and substantially at the middle of the distance between the pins 13 and 18. A U-shaped cut 21a is formed in the end portion of each of the drive arms 21 which are extended to the left of the shafts 23 in FIG. 1. The U-shaped cuts 21a thus formed are engaged with the engaging pin 18. The driven arm 22 is extended from the coupling part 20 downwardly of the shafts 23, and the spherical protrusion 22a is formed into the end portion of the driver arm 12. The spherical protrusion 22a is engaged with a recess 17a formed in the actuating element 17.

In the embodiment, the length of the arms 21 and 22; that is, the distance G between each of the shafts 23 and the contact point of the respective cut 21a and the engaging pin 18 is equal to the distance g between the shaft 23 and the contact point of the spherical protrusion 22a and the actuating element 17.

When, in the lever operating device thus constructed, the lever 12 is swung in the direction of the arrow A; i.e., from the low beam position L indicated by the solid line in FIG. 1 to the high beam position H indicated by the two-dot chain lines, the swing displacement of the lever 12 is transmitted through the engaging pin 18 to the transmission member 19, as a result of which the latter 19 is swung in the direction of the arrow J. As the transmission member 19 is swung in this manner, the spherical protrusion 22a pushes and moves the actuating element 17 in the direction of the arrow C, as a result of which the dimmer switch is operated to switch the low beam of the head light over to the high beam.

When the lever 12 is swung in the direction of the arrow B; i.e., from the high beam position H to the low beam position L, the swing displacement of the lever 12 is transmitted through the engaging pin 18 to the transmission member 19, so that the latter 19 is swung in the direction of the arrow K. As the transmission member 19 is swung in this manner, the spherical protrusion 22a pushes and moves the actuating element 17 in the direction of the arrow D, as a result of which the dimmer switch is operated to switch the high beam of the headlight to the low beam.

As is apparent from the above description, in .the embodiment of the invention, the arms 21 and 22 are equal in length, and therefore the actuating element 17 is moved the same distance as the engaging pin 18 swings. Hence, by making the distance between the shaft pin 13 and the engaging pin 18 of the lever 12 equal to the length E of the arm 4 of the conventional device, the actuating element 17 can be moved the same distance as the conventional one, and the length of the arm 22 may be about a half of the length E of the conventional arm 4. This means that the actuating element 17 can be set near the lever 12, and the lever operating device can be reduced in thickness when compared with the conventional device.

Figure 3:
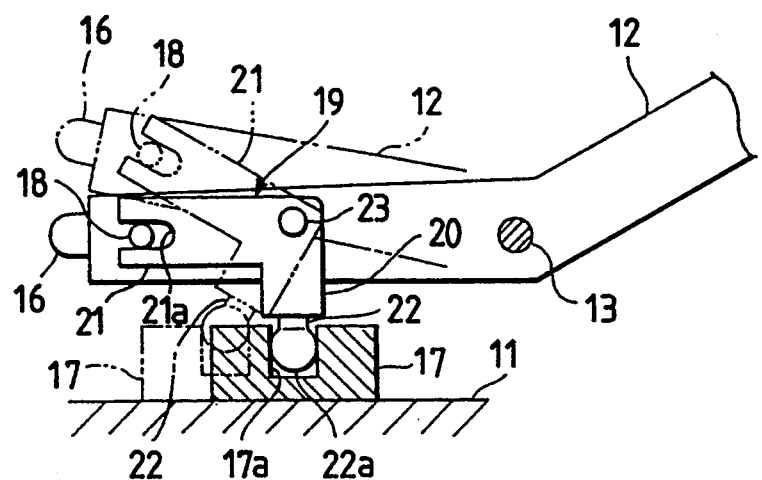
FIG. 3 is a side view, corresponding to FIG. 1, showing another lever operating device, which constitutes another embodiment of the invention.

As shown in FIG. 3, in the case where it is possible to increase the distance between the shaft pin 13 and the engaging pin 18 of the lever 12, then the swing displacement of the engaging pin 18 can be decreased when transmitted to the actuating element 17. Hence, in this case, the length of the driven arm 22 can be shorter than that of the driving arms 21; that is, the thickness of the resultant dimmer switch can be decreased more.

The driven arm 22 may be longer than the driving arms 21. For instance in the case where the swing displacement of the engaging pin 18 is shorter than the amount of movement for which the actuating element 17 should be moved, the driven arm 22 may be made longer than the driving arms 21, so that the swing displacement of the engaging pin is increased when transmitted to the actuating element 17.

While a few embodiments of the invention have been described, it is particularly understood that the invention is not limited thereto or thereby, and it is obvious to those skilled in the art that various changes and modifications may be made therein without departing from the invention. For instance, the engaging pin 18 may be positioned to a side opposite to the side of the stepping wall 15 through the shaft pin 13 of the lever 12. The above-described embodiments concern the lever operating device for the dimmer switch; however, the technical concept of the invention can be extensively applied to the case where a switch is operated by swinging a lever.

As was described above, in the lever operating device of the invention, the displacement transmitting means is provided on the lever at the predetermined distance from the swing fulcrum of the lever, and the swing displacement of the displacement transmitting means is transmitted through the transmission member to the actuating element. Hence, the movement distance of the actuating element is equal to that of the conventional one, and the length of the arm of the transmission member can be decreased. Therefore, the switch can be reduced in thickness as a whole.

What is claimed is:

1. A lever operating device for a switch, comprising:
a lever swingably supported on a base body;
an actuating element movably provided on said base body, said actuating element being moved to operate said switch; and
displacement transmitting means for transmitting a movement of said lever to said actuating element, said displacement transmitting means being separately provided on said lever and including, a displacement transmitting member on said lever at a predetermined distance from a swing fulcrum of said lever, and a transmission member swingably supported on said base body, said transmission member continuously engaging with said displacement transmitting member and said actuating element,
wherein a swing fulcrum of said transmission member is located between said swing fulcrum of said lever and said displacement transmitting member, and
wherein an operating portion of said lever receives a force causing movement of said lever about the swing fulcrum of said lever, said operating portion and said displacement transmitting member being on opposite sides of the swing fulcrum of said lever.

2. A lever operating device for a switch as claimed in claim 1 wherein said transmission member includes a driving arm engaged with said displacement transmitting member and a driven arm engaged with said actuating element.

3. A lever operating device for a switch as claimed in claim 2, wherein said driving arm forms substantially 90° with said driven arm.

4. A lever operating device for a switch, comprising:
a lever swingably supported on a base body;
an actuating element movably provided on said base body, said actuating element being moved to operate said switch;
displacement transmitting means for transmitting a movement of said lever to said actuating element, said displacement transmitting means being separately provided on said lever and including, a displacement transmitting member on said lever at a predetermined distance from a swing fulcrum of said lever, and a transmission member swingably supported on said base body, said transmission member continuously engaging with said displacement transmitting member and said actuating element; and
a slider protruding from one end of said lever for controlling the movement of said lever by engagement with a stepping mechanism contained in the base body,
wherein a swing fulcrum of said transmission member is located between said swing fulcrum of said lever and said displacement transmitting member.

5. A lever operating device for a switch, comprising:
a lever swingably supported on a base body;
an actuating element movably provided on said base body, said actuating element being moved to operate said switch; and
displacement transmitting means for transmitting a movement of said lever to said actuating element, said displacement transmitting means being separately provided on said lever and including, a displacement transmitting member on said lever at a predetermined distance from a swing fulcrum of said lever, and a transmission member swingably supported on said base body, said transmission member continuously engaging with said displacement transmitting member and said actuating element,
wherein a swing fulcrum of said transmission member is located between said swing fulcrum of said lever and said displacement transmitting member,
wherein said lever includes both an operating portion and a transmission portion separated by said swing fulcrum of said lever,
wherein said displacement transmitting member is attached to said transmission portion of said lever, and
wherein said operating portion of said lever receives a force causing movement of said lever about said swing fulcrum of said lever.

* * * * *